(12) United States Patent
Rosik

(10) Patent No.: US 8,929,222 B2
(45) Date of Patent: Jan. 6, 2015

(54) COMMUNICATIONS SYSTEM

(75) Inventor: Christophe Rosik, Reading (GB)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 117 days.

(21) Appl. No.: 13/059,343

(22) PCT Filed: Aug. 4, 2009

(86) PCT No.: PCT/JP2009/064078
§ 371 (c)(1),
(2), (4) Date: Feb. 16, 2011

(87) PCT Pub. No.: WO2010/024111
PCT Pub. Date: Mar. 4, 2010

(65) Prior Publication Data
US 2011/0141910 A1    Jun. 16, 2011

(30) Foreign Application Priority Data

Aug. 28, 2008  (GB) .................................. 0815679.6

(51) Int. Cl.
*H04W 60/00*   (2009.01)
*H04L 12/26*   (2006.01)
*H04W 48/20*   (2009.01)
*H04W 4/22*    (2009.01)
*H04W 76/00*   (2009.01)

(52) U.S. Cl.
CPC ................ *H04W 48/20* (2013.01); *H04W 4/22* (2013.01); *H04W 76/007* (2013.01)
USPC ........................................ 370/241; 455/404.1

(58) Field of Classification Search
CPC .. H04W 36/14; H04W 36/00; H04W 2242/04
USPC ........................................ 370/241; 455/404.1
See application file for complete search history.

(56) References Cited

U.S. PATENT DOCUMENTS 7,092,716 B2   8/2006  Nizri et al.
7,596,378 B1   9/2009  Nizri et al.
(Continued)

FOREIGN PATENT DOCUMENTS

CA       2653179 A1   12/2007
CN       1338189 A     2/2002
(Continued)

OTHER PUBLICATIONS

3GPP TS 23.272 v8.0.0, $3^{rd}$ Generation Partnership Project; Technical Specification Group Services and System Aspects; Circuit Switched Fallback in Evolved Packet System; Stage 2 (Release 8), Jun. 2008, 41 pages.

(Continued)

*Primary Examiner* — Jeffrey M Rutkowski
*Assistant Examiner* — Romani Ohri
(74) *Attorney, Agent, or Firm* — Sughrue Mion, PLLC

(57) ABSTRACT

A cellular communications system is provided in which a user device selects a cell with which to register based on whether or not a candidate cell can provide an emergency call service. This determination is preferably determined having reference to a radio access technology associated with the candidate cell and, where the cell is an E-UTRA cell, having reference to information provided in system information output by the cell.

21 Claims, 4 Drawing Sheets

(56) References Cited

U.S. PATENT DOCUMENTS

| | | | |
|---|---|---|---|
| 2002/0197992 A1* | 12/2002 | Nizri et al. | 455/435 |
| 2005/0075125 A1 | 4/2005 | Bada et al. | |
| 2005/0090224 A1* | 4/2005 | Dorsey et al. | 455/404.1 |
| 2006/0040700 A1* | 2/2006 | Roberts et al. | 455/525 |
| 2006/0094397 A1 | 5/2006 | Raghuram et al. | |
| 2006/0121877 A1 | 6/2006 | Raghuram et al. | |
| 2007/0142049 A1 | 6/2007 | Chae et al. | |
| 2008/0009262 A1 | 1/2008 | Rudolf et al. | |
| 2008/0102784 A1* | 5/2008 | Mittal et al. | 455/404.1 |
| 2008/0214174 A1 | 9/2008 | Palenius | |
| 2009/0088154 A1* | 4/2009 | Umatt et al. | 455/434 |
| 2010/0014508 A1* | 1/2010 | Yang | 370/352 |
| 2010/0022242 A1 | 1/2010 | Nizri et al. | |
| 2010/0202413 A1* | 8/2010 | Vikberg et al. | 370/332 |

FOREIGN PATENT DOCUMENTS

| | | |
|---|---|---|
| CN | 1615667 A | 5/2005 |
| CN | 1852604 A | 10/2006 |
| CN | 1853424 A | 10/2006 |
| CN | 101005666 A1 | 7/2007 |
| CN | 101031135 A | 9/2007 |
| CN | 101061740 A | 10/2007 |
| CN | 101073285 A | 11/2007 |
| JP | 2002300663 A | 10/2002 |
| JP | 2002534822 A | 10/2002 |
| WO | 2006080080 A1 | 8/2006 |
| WO | 2007/035736 A2 | 3/2007 |
| WO | 2007/103055 A2 | 9/2007 |
| WO | 2008/018937 A1 | 2/2008 |
| WO | 2008/073600 A2 | 6/2008 |
| WO | 2008/134281 A2 | 11/2008 |

OTHER PUBLICATIONS

3GPP TS 36.304 V8.2.0, V8.2.0, $3^{rd}$ Generation Partnership Project; Technical Specification Group Radio Access Network; Evolved Universal Terrestrial Radio Access (E-UTRA); User Equipment (UE) procedures in idle mode (Release 8), May 2008, 27 pages.

International Search Report for PCT/JP2009/064078, dated Oct. 13, 2009.

United Kingdom Search Report for GB0815679.6, dated Nov. 19, 2008.

Office Action dated Apr. 2, 2013 issued by the State Intellectual Property Office of P.R. China in corresponding Chinese Patent Application No. 200980133835.1.

Office Action, dated Nov. 8, 2013, issued by the State Intellectual Property Office of the People's Republic of China, in counterpart Application No. 200980133835.1.

Communication dated Jul. 23, 2014 from the Japanese Patent Office in counterpart Japanese Patent Application No. 2014004134.

3rd Generation Partnership Project; Technical Specification Group Radio Access Network; User Equipment, 3GPP TS 25.304 V8.2.0 (May 2008), 3GPP, May 2008.

"Clarification of emergency call procedures for CS, PS, and IMS capable UEs", Change Request, TSG-SA WG1 #21, S1-030733, Jul. 7-11, 2003, 5 total pages, Sophia Antipolis, France.

Communication dated Jul. 25, 2014, issued by the State Intellectual Property Office of P.R. China in counterpart Chinese application No. 200980133835.1.

* cited by examiner

COMMUNICATIONS SYSTEM

TECHNICAL FIELD

The present invention relates to cellular communication devices that operate in accordance with the Long Term Evolution (LTE) of UTRAN (called Evolved Universal Terrestrial Radio Access Network (E-UTRAN)) as well as to the operation of communication nodes within E-UTRAN. The invention has particular relevance to the provisioning of emergency call services to such cellular devices when operating in a limited service operating state.

BACKGROUND ART

In mobile telecommunications networks, there is a requirement for User Equipment (UE), that is under radio coverage, always to be able to make emergency calls, even when the UE has no (U)SIM card or when registration of the UE to a network has failed. Provision must, therefore, be made within the mobile communications networks to allow UEs to make such emergency calls.

The 3GPP has specified that the E-UTRA network will be a packet switched (PS) network only, so no circuit switched (CS) services will be implemented. This means that voice traffic has to be performed using Voice over IP (VoIP). However, due to the costs involved in implementing VoIP, 3GPP has considered that E-UTRAN may not support VoIP in Release-8 and envisages making it optional in subsequent releases. Therefore, to provide voice call services to UEs camped on an LTE cell, 3GPP has defined a mechanism that redirects the voice call request to a cell that supports CS calls. This mechanism is called CS Fallback and is described in 3GPP standards document TS 23.272. In essence this mechanism allows the UE to request a change of cell to one that supports voice services—typically to a GSM cell or a UTRA cell which support the CS domain.

As an emergency call is a voice call, it is envisaged that this CS Fallback mechanism will be used to establish the emergency call. However, the inventor has realized that this will cause a number of problems. Firstly, the current CS Fallback procedure requires the UE to be registered in NORMAL SERVICE before it can be used. This is because it requires the UE to send a "Serving Request" to the E-UTRA network and when the UE is registered with the cell in LIMITED SERVICE, the network is configured to reject such requests. Therefore, with the current CS Fallback procedure, emergency calls cannot be made when the UE is in LIMITED SERVICE mode. Further, even if the CS Fallback procedure were to be amended to allow the cell to accept the request, other technical problems remain. In particular, CS Fallback requires the implementation of inter-RAT mobility procedures which require the exchange of additional messages between the UE and the network and, in some cases, some UE measurements to be made. These additional procedures require additional signaling overhead, can increase the likelihood of emergency call failure and introduce a significant delay for emergency call establishment.

DISCLOSURE OF INVENTION

The present invention aims to provide an alternative way of ensuring that emergency calls can be made from UEs when operating in their LIMITED SERVICE mode, under E-UTRA coverage.

In one embodiment, this is achieved by ensuring that when the UE is registering with a cell when in its LIMITED SERVICE mode, that it does so with a cell that can provide voice call services. The UE can either infer this from existing information within the system information broadcast by the cells or the cells may be configured to include new parameters within their broadcast information which specify whether or not the cell can provide an emergency call service.

According to one aspect, the present invention provides a communications device comprising: means for identifying an acceptable cell; means for determining the Radio Access Technology, RAT, supported by the cell; means for selecting the cell if the determined RAT indicates that the cell can provide a circuit switched (CS) emergency call service; and means for rejecting the cell if the determined RAT indicates that the cell cannot provide a CS or packet switched (PS) emergency call service.

According to another aspect, the present invention provides a mobile communications device comprising: means for identifying an acceptable cell; means for determining if the acceptable cell can provide an emergency call service without redirecting the device to another cell; means for rejecting the acceptable cell if the cell is not able to provide an emergency call service without redirection; and means for selecting the cell if the cell is able to provide an emergency call service without redirection.

The identification of an acceptable cell may include a scan of available frequencies or it may include the use of previous scan information.

The determination if the acceptable cell can provide an emergency call service without redirecting the device to another cell may include determining the radio access technology supported by the acceptable cell. If the radio access technology of the cell is E-UTRA, then the determining means may obtain cell system information output by the cell and may process the cell system information to determine if the cell can perform an emergency call service without redirection. This processing may include identifying the value of a parameter of the cell indicating whether or not an emergency call service is available without redirection. If the radio access technology of the cell is not E-UTRA, then the determining means may infer that the cell is capable of providing an emergency call service.

If the cell is used by a plurality of Public Land Mobile Networks (PLMNs), the cell system information may include a parameter for each PLMN indicating if the PLMN provides an emergency call service and the selecting means may register the mobile telephone with a PLMN that provides an emergency call service without redirection.

The information in the cell system information may identify indirectly if the cell is capable of performing an emergency call service without redirection. For example, the parameter may identify whether or not the cell can support a VoIP service and if it does then the determining means can infer that the cell can provide an emergency call service without redirecting the device to another cell if the cell can support the VoIP service. Alternatively, the parameter may identify whether or not the cell can support CS Fallback. If it can, then the determining means can infer that the cell can not provide an emergency call service without redirecting the device to another cell. If it can not support CS Fallback, then the determining means can infer that emergency call service may be supported (although further information may be needed in the system information to confirm this).

The above operation of the mobile communications device may be performed when the device enters a limited service mode of operation. Such a limited service mode of operation may occur when the device is switched on, if the SIM is not available, when registration of the device with a network has been rejected or when no suitable cells have been found.

This aspect of the invention also provides a method performed by a mobile communications device, the method comprising identifying an acceptable cell; determining if the acceptable cell can provide an emergency call service without redirecting the device to another cell; rejecting the acceptable cell if said determining step determines that the cell is not able to provide an emergency call service without redirection; and selecting the cell if said determining step determines that the cell is able to provide an emergency call service without redirection.

In a preferred embodiment, an E-UTRA communications node is adapted to support the cell selection procedure described above. It does this by outputting (for example on a broadcast channel of the cell) at least one parameter identifying whether or not the cell of the communications node provides an emergency service to a registered mobile communications device without redirecting the mobile communications device to another cell. This information makes it easier for the mobile communications device to be able to make the determination described above. In one embodiment, where multiple Public Land Mobile Networks (PLMNs) share the cell, the communications node may output a parameter associated with each PLMN identifying if that PLMN can provide an emergency call service without redirection.

The present invention also provides a computer implementable instructions product comprising computer implementable instructions for causing a programmable computer device to become configured as the above mobile device or as the above E-UTRA communications node. The product may include a computer readable medium or a signal that carries the instructions.

BRIEF DESCRIPTION OF THE DRAWINGS

These and various other aspects of the invention will become apparent from the following detailed description of embodiments which are described, by way of example only, with reference to the accompanying Figures in which.

MODE FOR CARRYING OUT THE INVENTION

Overview

Figure 1:
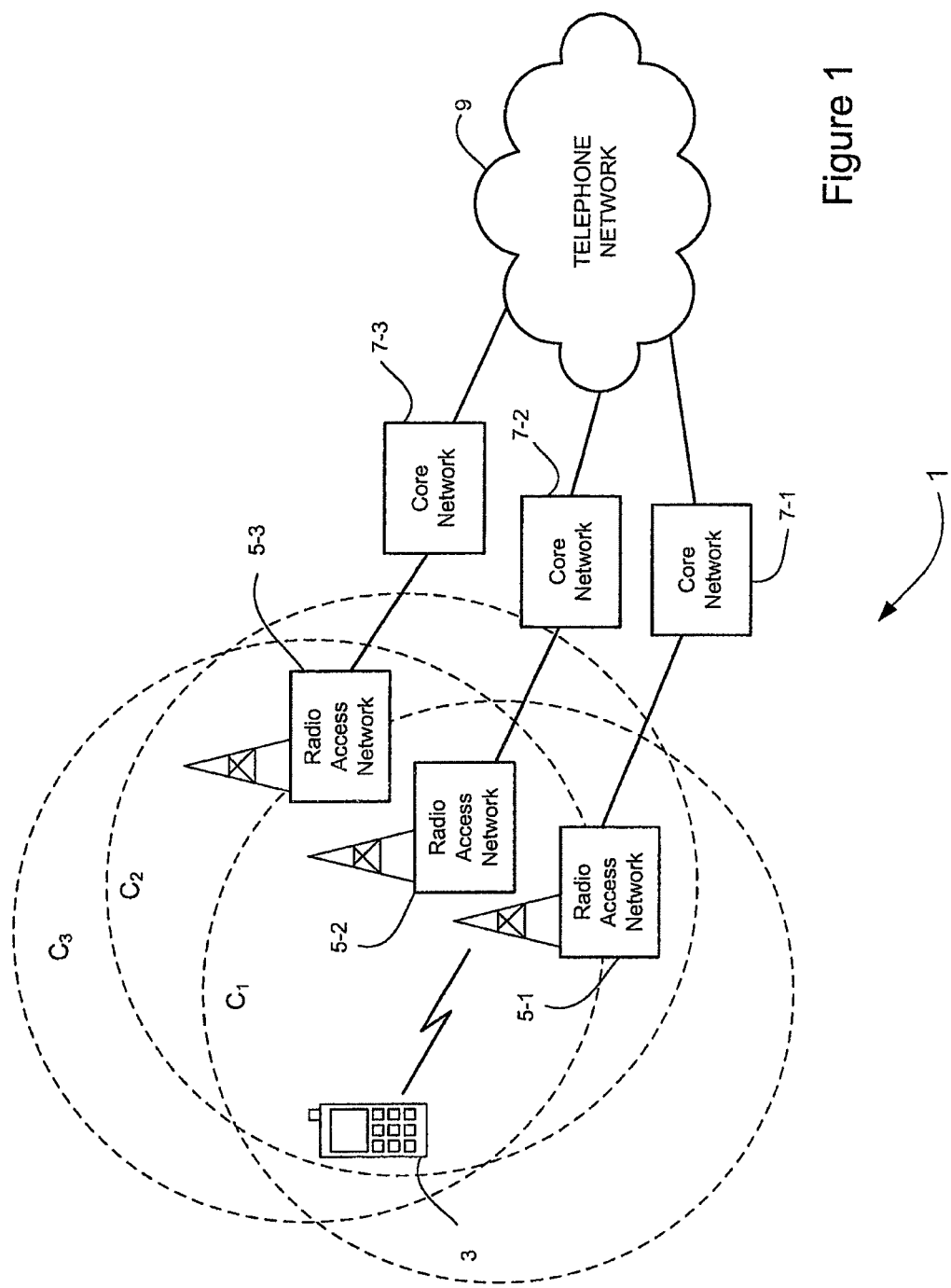
FIG. 1 schematically illustrates a mobile telecommunication system of a type to which the embodiment is applicable.

FIG. 1 schematically illustrates part of a mobile (cellular) telecommunications system 1 having a mobile telephone 3, three radio access networks 5-1, 5-2 and 5-3 and corresponding core networks 7-1, 7-2 and 7-3. Each of the radio access networks 5 operates to communicate with mobile telephones 3 within a respective cell, which are illustrated in FIG. 1 by the dashed circles labeled $C_1$, $C_2$ and $C_3$ respectively. In the illustrated Figure, the mobile telephone 3 is within the all of the cells and so can therefore register with any of the three radio access networks 5 to be able to communicate with other users (not shown) via the selected radio access network 5, its associated core network 7 and the telephone network 9. In this embodiment, radio access networks 5-1 and 5-2 are E-UTRA access networks and radio access network 5-3 is a GSM access network. If the mobile telephone 3 is LTE compliant, then it will normally register with E-UTRA radio access network 5-1 or 5-2. However, as will be described in more detail below, in this embodiment, this will depend on the service state of the mobile telephone 3 and on the voice call capabilities of the E-UTRA core networks 7-1 and 7-2.

In accordance with the 3GPP standard, emergency calls are voice calls that are established in priority within the network and should be available at any moment:

1) When a UE (eg a mobile telephone 3) is successfully attached on a Public Land Mobile Network (PLMN). In this case the UE will be camped on a "suitable" cell and is registered to the network in NORMAL SERVICE.
2) When a UE is not yet attached on a PLMN, when the attach procedure has been rejected or when the (U)SIM is not available. In this case, the UE will be camped on an "acceptable" cell and is registered in LIMITED SERVICE. In this state only emergency calls are authorized.

The present embodiment is concerned with the second scenario discussed above and proposes a modification to the cell selection procedure performed by the mobile telephone 3 when selecting the cell with which to register, so that the mobile telephone 3 only registers with a cell that can provide voice call services.

Radio Access Network & Core Network

Figure 2:
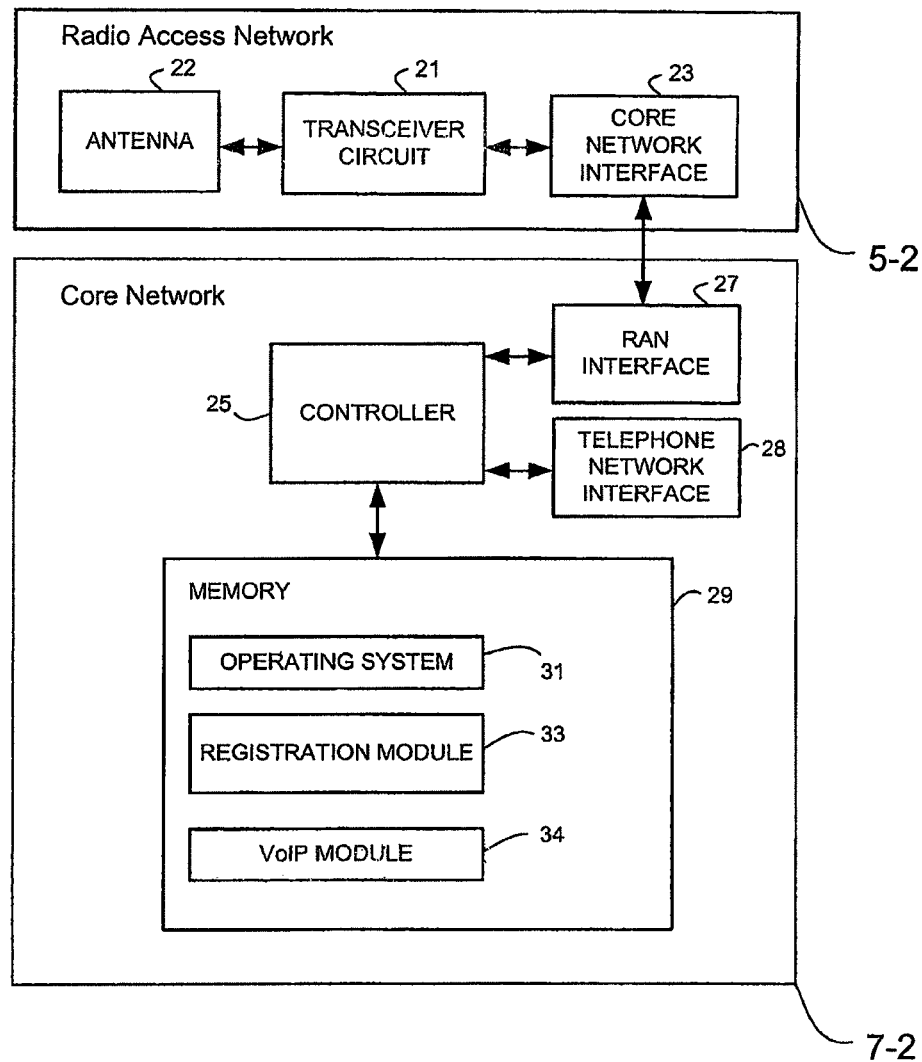
FIG. 2 is a block diagram illustrating components of a E-UTRA Radio Access Network and Core network forming part of the system shown in FIG. 1.

Although each radio access network 5 may operate a number of different cells, each providing different services to the mobile telephone 3, in this embodiment it will be assumed that each radio access network 5 operates a single cell. It is also assumed that E-UTRA core network 7-1 does not provide voice call services and that E-UTRA core network 7-2 and GSM core network 7-3 do provide voice call services. FIG. 2 is a block diagram illustrating the main components of radio access network 5-2 and core network 7-2 used in this embodiment. As shown, radio access network 5-2 includes a transceiver circuit 21 which is operable to transmit signals to and to receive signals from the mobile telephone 3 via one or more antennae 22 and which is operable to transmit signals to and to receive signals from the core network 7-2 via a core network interface 23. The radio access network 5-2 will also include a controller which controls the operation of the radio access network 5-2 in accordance with software stored in memory, although these have not been shown for simplicity.

The core network 7-2 includes a controller 25 which controls the operation of the core network 7-2 and which is operable to transmit data to and to receive data from the radio access network 5-2 via a RAN interface 27; and which is operable to transmit data to and to receive data from the telephone network 9 via a telephone network interface 28. As shown, the controller 25 controls the operation of the core network 7-2 in accordance with software stored in memory 29. The software includes, among other things, an operating system 31, a registration module 33 and a VoIP module 34. The registration module 33 maintains records of the mobile telephones 3 that are registered with the radio access network 5-2 and their service state (e.g. NORMAL SERVICE or LIMITED SERVICE) and VoIP module 34 provides voice call services to registered mobile telephones 3. Core network 7-1 will be similar to core network 7-2 except that it will not have the VoIP module 34 and so can not provide voice call services.

Mobile Telephone

Figure 3:
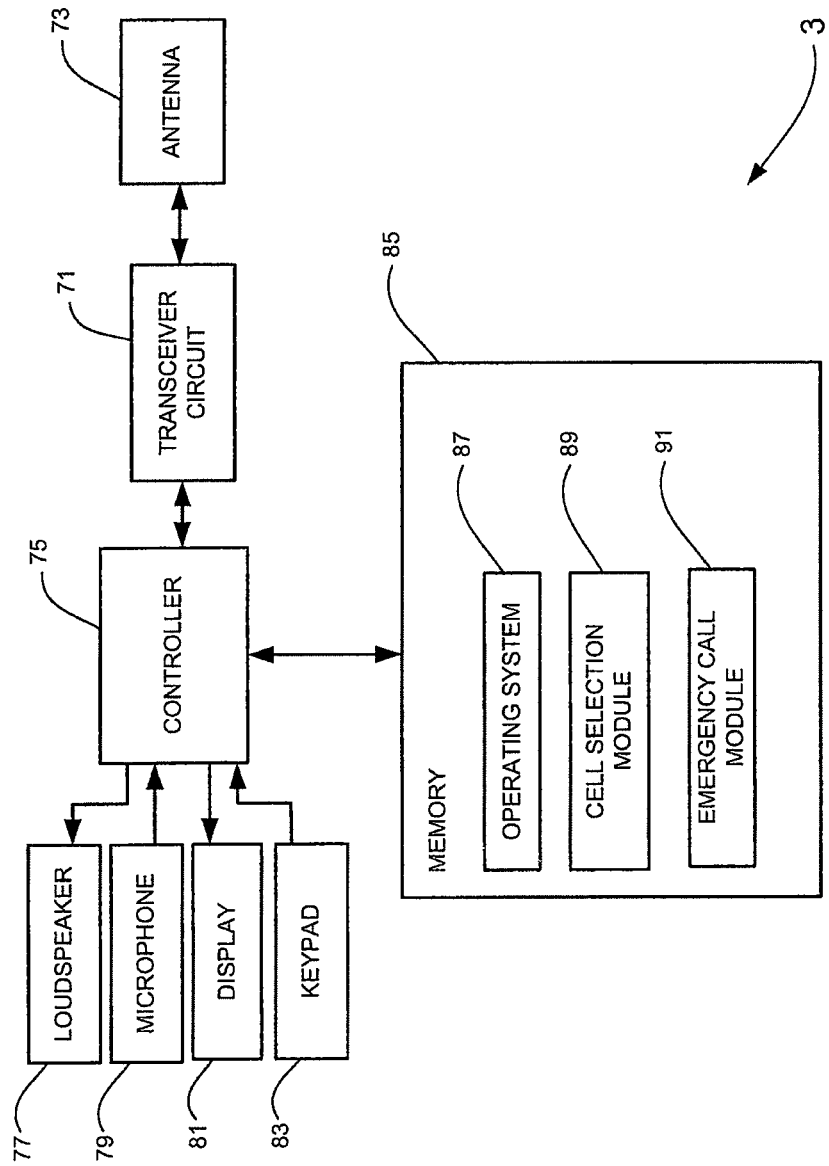
FIG. 3 is a block diagram illustrating components of a mobile communication device forming part of the system shown in FIG. 1.

FIG. 3 schematically illustrates the main components of the mobile telephone 3 shown in FIG. 1. As shown, the mobile telephone 3 includes a transceiver circuit 71 that is operable to transmit signals to and to receive signals from the selected radio access network 5 via one or more antennae 73. As shown, the mobile telephone 3 also includes a controller 75 which controls the operation of the mobile telephone 3 and which is connected to the transceiver circuit 71 and to a loudspeaker 77, a microphone 79, a display 81, and a keypad 83. The controller 75 operates in accordance with software modules stored within memory 85. As shown, these software modules include, among other things, an operating system 87, a cell selection module 89 and an emergency call module 91. The cell selection module 89 operates to control the cell selection process (described in more detail below) when the mobile telephone 3 is choosing the radio access network 5 with which to register and the emergency call module 91 operates to allow the user of the mobile telephone 3 to be able to request and make emergency voice calls.

In the above description, both the core network 7 and the mobile telephone 3 are described, for ease of understanding, as having various discrete software modules. Whilst these software modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Cell Selection

According to the current 3GPP standard documentation, the mobile telephone 3 has to perform an "any cell selection" when the mobile telephone 3 is turned on; if the (U)SIM is not available; when registration has been rejected; and when no "suitable" cells have been found. This any cell selection procedure involves the mobile telephone 3 scanning all RF channels in the E-UTRAN, UTRAN and GSM frequency bands according to the mobile telephone's capabilities to identify and camp on an "acceptable" cell, irrespective of the cell's PLMN identity. This embodiment proposes a modification in which the cell selection process requires the mobile telephone 3 to determine if the found acceptable cell can provide an emergency call service (without redirection) so that the mobile telephone 3 does not camp on a cell that does not provide an emergency call service. This process is illustrated in FIGS. 4 and 5 and is controlled by the cell selection module 89.

Figure 4:
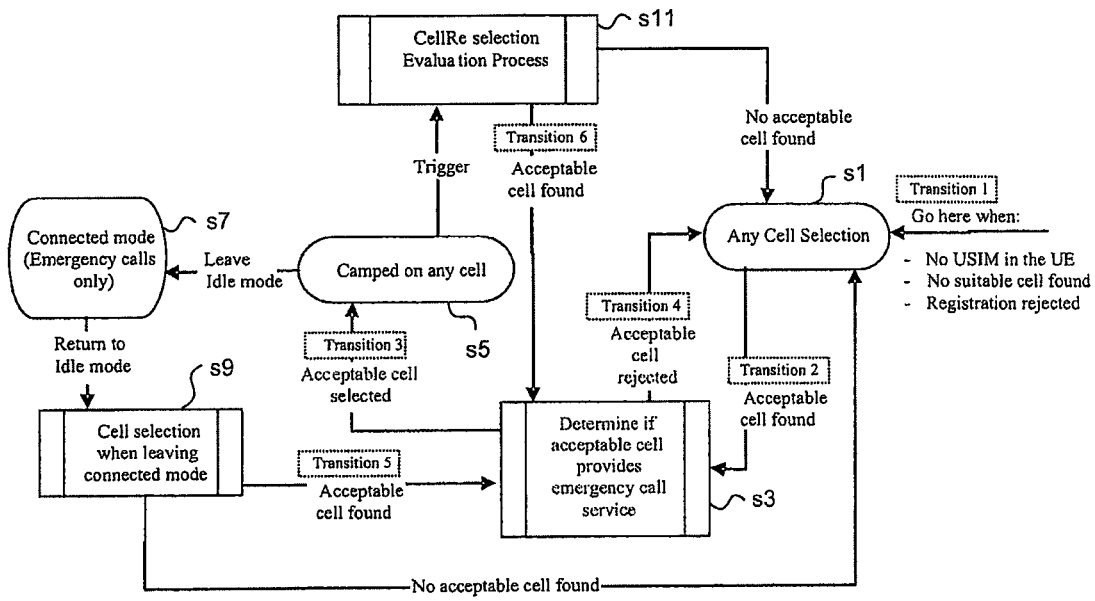
FIG. 4 is a state transition diagram illustrating a number of different states of the mobile communications device shown in FIG. 3 and how transitions may be effected between the states.
Figure 5:
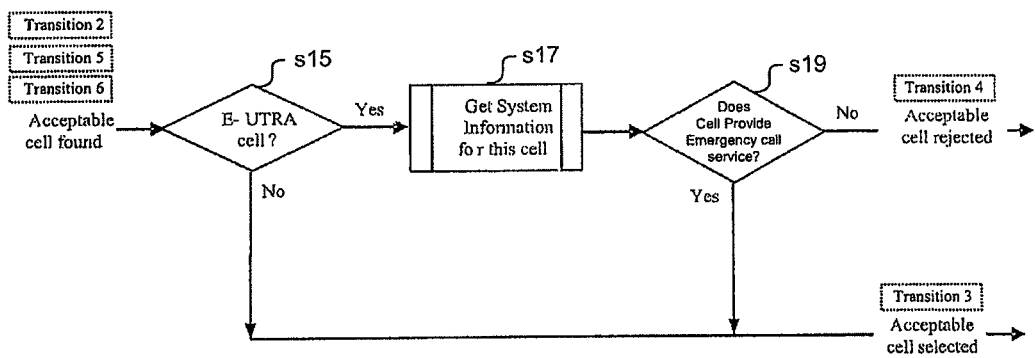
FIG. 5 is a flow chart illustrating the steps performed by the mobile communication device shown in FIG. 3 when selecting a cell with which it will register.

FIG. 4 is a state transition diagram illustrating the operation of the mobile telephone 3 when the mobile telephone 3 is turned on; if the (U)SIM is not available; when registration has been rejected; or when no suitable cells have been found (Transition 1). As shown, the mobile telephone 3 enters step s1 in which the mobile telephone 3 performs the "any cell selection" process by scanning for all RF channels to find any "acceptable" cells (ie those on which the mobile telephone 3 is allowed to camp to obtain limited service). If at least one acceptable cell is found, regardless of the PLMN associated with the cell, then the mobile telephone 3 transitions (Transition 2) to step s3, where the mobile telephone 3 determines (directly or indirectly) if the found cell provides an emergency call service. If it does not (as would be the case for cell $C_1$ shown in FIG. 1), then the acceptable cell is rejected and the mobile telephone 3 transitions (Transition 4) back to step s1 where the mobile telephone 3 selects another acceptable cell. Once an acceptable cell is found that does provide an emergency call service (such as cell $C_2$ or cell $C_3$ in FIG. 1), then the mobile telephone 3 transitions (Transition 3) from step s3 to step s5, where the mobile telephone 3 registers with the Public Land Mobile Network (PLMN) associated with the cell in LIMITED SERVICE and camps on this cell in an Idle mode.

If the user requests an emergency call, then the mobile telephone 3 leaves its current Idle mode and enters step s7 where the mobile telephone 3 enters its Connected mode in which Emergency calls can be made using the emergency call module 91. Once the call has been made or if the user cancels the action, the mobile telephone 3 enters a "cell selection when leaving connected mode" processing step s9, where the mobile telephone 3 initially tries to find (from the results of a previous RF scan) the previous or an alternative acceptable cell. If an acceptable cell is not found, then the processing returns to step s1, where a full RF scan is performed again to find an acceptable cell. If an acceptable cell is found in step s9, then the mobile telephone 3 transitions (Transition 5) back to processing step s3 where it determines if the found acceptable cell provides emergency call services.

When in its Idle mode in step s5, the mobile telephone 3 may be triggered to enter a cell Re-selection process in step s11. This may be triggered, for example, periodically or if the signal power of the current cell is not strong enough. The cell re-selection process may start looking for another acceptable cell from cell data obtained the last time the "any cell selection process" (s1) was performed. If no acceptable cell is found, then the processing returns to step s1 where a full scan of available RF channels is performed again. If an acceptable cell is found, then the mobile telephone 3 transitions (Transition 6) to step s3, where the mobile telephone 3 determines if the acceptable cell that has been found can provide an emergency call service.

FIG. 5 illustrates the processing steps performed by the mobile telephone 3 in step s3 shown in FIG. 4. As discussed above, step s3 is initiated from Transition 2, 5 or 6 when an acceptable cell is found. At step s15, the mobile telephone 3 determines the radio access technology (RAT) supported by the found acceptable cell. If the RAT is E-UTRA, then the processing proceeds to step s17, where the mobile telephone 3 reads the cell's broadcast control channel (BCCH) and decodes the broadcast system information for the cell. Then, in step s19, the mobile telephone 3 verifies if the decoded system information includes information that indicates directly or indirectly if the cell is able to perform an emergency call without redirection. If the information is not present or if it is present but set as not supported, then the cell is rejected and the processing returns to step s1 (Transition 4) shown in FIG. 4. If the information is present and set to supported, then the cell is selected and the processing proceeds to step s5 (Transition 3) shown in FIG. 4. If at step s15, the mobile telephone 3 determines that the RAT is GSM or UTRA, then because voice services are always available in these types of cells, the cell is selected and the processing proceeds to step s5 (Transition 3) shown in FIG. 4.

Cell System Information

As those skilled in the art will appreciate, to perform the cell selection process discussed above, the mobile telephone 3 determines if the acceptable cell is capable of providing emergency call services without redirection. To support this determination, the E-UTRA radio access networks 5-1 and 5-2 are preferably arranged to include a specific parameter embedded within its system information ("SystemInformation-BlockType1" message) that they broadcast over their broadcast control channels and that identifies whether or not call services are supported. Where the cell is used by more than one PLMN, a respective parameter may be provided for each PLMN that uses the cell. In case it is necessary to indicate to the mobile telephone 3 the PLMN identity of the network 7 that supports the emergency call, the parameter may be included as follows:

```
SystemInformationBlockType1 ::=     SEQUENCE {
...
        plmn-IdentityList               SEQUENCE (SIZE (1..6)) OF SEQUENCE {
            plmn-Identity                   PLMN-Identity,
            cellReservedForOperatorUse          ENUMERATED {reserved, notReserved}
            EmergencyOverLTE                ENUMERATED {supported, not supported}
        },
...
}
```

The mobile telephone 3 then uses this information to determine if at least one PLMN is able to provide an emergency call service without redirection. If so, then the cell can be selected for registration in LIMITED SERVICE.

Alternatively, the parameter may be directly linked to the cell irrespective of the PLMN identity such as:

```
SystemInformationBlockType1 ::=     SEQUENCE {
...
        cellAccessRelatedInformation    SEQUENCE {
            plmn-IdentityList               SEQUENCE (SIZE (1..6)) OF SEQUENCE {
                plmn-Identity                   PLMN-Identity,
                cellReservedForOperatorUse          ENUMERATED {reserved, notReserved}
            },
            trackingAreaCode                TrackingAreaCode,
            cellIdentity                    CellIdentity,
            cellBarred                      ENUMERATED {barred, notBarred},
            EmergencyOverLTE                ENUMERATED {supported, not supported}
            intraFrequencyCellReselection   BOOLEAN OPTIONAL, -- Cond
CellBarred
            cellReservationExtension        ENUMERATED {reserved, notReserved},
            csg-Indication                  BOOLEAN
        },
...
}
```

If a specific parameter is not included in the system information broadcast by the cell, then the UE may make the determination from other broadcast information. For example, if the broadcast system information indicates that the cell can or cannot support the VoIP service, then the mobile telephone 3 can use this information to determine if an emergency call can be established through this cell. In particular, if VoIP is supported, then the UE can infer that Emergency calls are supported without redirection and if VoIP is not supported then the mobile telephone 3 can infer that the emergency call would have to be redirected through a different cell (such as a GERAN or UTRAN cell). Similarly, if the broadcast system information indicates that the cell can or cannot support CS fallback, then the mobile telephone 3 can use this information to determine if an emergency call can be established through this cell. In particular, if CS fallback is supported, then the mobile telephone 3 can infer that Emergency calls are not supported without redirection and if CS fallback is not supported then the mobile telephone 3 can infer that the emergency call service is supported.

Modifications and Alternatives

A detailed embodiment has been described above. As those skilled in the art will appreciate, a number of modifications and alternatives can be made to the above embodiment whilst still benefiting from the invention embodied therein. By way of illustration only a number of these alternatives and modifications will now be described.

In the above embodiments, a number of software modules were described. As those skilled will appreciate, the software modules may be provided in compiled or un-compiled form and may be supplied to the core network, radio access network or to the mobile telephone as a signal over a computer network, or on a recording medium. Further, the functionality performed by part or all of this software may be performed using one or more dedicated hardware circuits. However, the use of software modules is preferred as it facilitates the updating of radio access network 5 and the mobile telephone 3 in order to update their functionalities.

In the above embodiment, a mobile telephone was provided that communicated with a number of radio access networks. As those skilled in the art will appreciate, the invention is applicable to other types of user equipment (UE) such as laptop computers, Personal Digital Assistants or other hand held portable computer devices.

In the above embodiment, each radio access network was connected to their own core network 7. As those skilled in the art will appreciate, a cell can be part of a network sharing architecture in which there may be several core networks 7 that use the same cell and only some of those networks may support the Emergency call service without redirection.

FIG. 4 illustrates a specific way in which the cell selection process is performed taking into account whether or not the cell can perform Emergency call services. As those skilled in the art will appreciate, the cell selection process does not have to conform exactly to that shown in FIG. 4. For example, when the mobile telephone is triggered to perform a cell re-selection, the processing may jump directly to step s1, so that a full RF scan is performed.

This application is based upon and claims the benefit of priority from United Kingdom patent application No. 0815679.6, filed on Aug. 28, 2008, the disclosure of which is incorporated herein in its entirety by reference.

The invention claimed is:

1. A communications device comprising a processor with a cell selection module configured to:
    identify an acceptable cell on which the communications device may camp;
    determine the Radio Access Technology, RAT, supported by the cell;

when the determined RAT is a RAT that supports cells that can provide a circuit switched (CS) emergency call service, select the cell, as a cell on which to camp; and when the determined RAT is a RAT that supports cells that cannot provide a CS or packet switched (PS) emergency call service, reject the cell, as a cell on which to camp; and wherein when said cell selection module determines that the radio access technology is E-UTRA, the cell selection module obtains cell system information output by the cell and processes the cell system information to determine the cell can perform an emergency call service without redirection.

2. A device according to claim 1, wherein said cell selection module performs said identifying, said determining, said rejecting and said selecting responsive to the device being in a limited service mode of operation.

3. A device according to claim 2, configured to be in said limited service mode of operation when the device is switched on, if a SIM is not available, when registration of the device with a network has been rejected or when no suitable cells have been found.

4. A device according to claim 1, wherein the device is an LTE device and wherein when the determined RAT of the identified cell is E-UTRA, the cell selection module rejects the cell if the cell cannot provide an emergency call service without redirecting the device to another cell.

5. A device according to claim 1, wherein said cell selection module processes said system information to identify the value of a parameter of the cell indicating whether or not an emergency call service is available without redirection.

6. A device according to claim 5, wherein said cell is used by a plurality of Public Land Mobile Networks (PLMNs), wherein said system information includes a parameter for each PLMN indicating if the PLMN provides an emergency call service and wherein said cell selection module registers the device with a PLMN that provides an emergency call service without redirection.

7. A device according to claim 5, wherein said parameter identifies whether or not the cell can support a VoIP service and wherein said cell selection module determines that the cell can provide an emergency call service without redirecting the device to another cell if the cell can support the VoIP service.

8. A device according to claim 5, wherein said parameter identifies whether or not the cell can support CS fallback and wherein said cell selection module determines that the cell can provide an emergency call service without redirecting the device to another cell if the cell does not support CS fallback.

9. A device according to claim 1, wherein said cell selection module rejects the cell in dependence upon if it is an E-UTRA cell.

10. A communications method performed by a communications device comprising:
    identifying an acceptable cell on which the communications device may camp;
    determining the Radio Access Technology, RAT, supported by the cell;
    when the determined RAT is a RAT that supports cells that can provide a circuit switched (CS) emergency call service, selecting the cell, as a cell on which to camp; and
    when the determined RAT is a RAT that supports cells that cannot provide a CS or packet switched (PS) emergency call service, rejecting rejecting the cell, as a cell on which to camp; and
    wherein when said determining step determines that the radio access technology is E-UTRA, then obtaining cell system information output by the cell and processing the cell system information to determine if the cell can perform an emergency call service without redirection.

11. A method according to claim 10, wherein said identifying, said determining, said rejecting and said selecting are responsive to the device being in a limited service mode of operation.

12. A method according to claim 11, performed when the device is switched on, if a SIM is not available, when registration of the device with a network has been rejected or when no suitable cells have been found.

13. A method according to claim 10, wherein the device is an LTE device and wherein when the determined RAT of the identified cell is E-UTRA, the rejecting step rejects the cell if the cell cannot provide an emergency call service without redirecting the device to another cell.

14. A method according to claim 10, wherein said processing step processes said system information to identify the value of a parameter of the cell indicating whether or not an emergency call service is available without redirection.

15. A method according to claim 14, wherein said cell is used by a plurality of Public Land Mobile Networks (PLMNs), wherein said system information includes a parameter for each PLMN indicating if the PLMN provides an emergency call service and wherein said selecting step registers the device with a PLMN that provides an emergency call service without redirection.

16. A method according to claim 14, wherein said parameter identifies whether or not the cell can support a VoIP service and wherein said determining step determines that the cell can provide an emergency call service without redirecting the device to another cell if the cell can support the VoIP service.

17. A method according to claim 14, wherein said parameter identifies whether or not the cell can support CS fallback and wherein said determining step determines that the cell can provide an emergency call service without redirecting the device to another cell if the cell does not support CS fallback.

18. A method according to claim 10, wherein said rejecting step rejects the cell in dependence upon if the cell is an E-UTRA cell.

19. A communications system comprising a cellular communications device according to claim 1 and a communications node configured to communicate with the cellular communication devices, the communications node comprising:
    an output configured to output system cell information relating to the operation of a cell of the communications node for use by the cellular communication devices; and
    a registration device, responsive to the cellular communications device, for registering the cellular communication devices with the cell of the communications node.

20. A non-transitory computer readable medium storing computer implementable instructions product comprising computer implementable instructions for causing a programmable computer device to perform the method of claim 10.

21. A communications device comprising a processor with a cell selection module configured to:
    identify an acceptable cell on which the communications device may camp;
    determine the Radio Access Technology, RAT, supported by the cell, with reference to a specific parameter included in a system information block (SIB), the specific parameter being indicative of whether or not the RAT supports a circuit switched (CS) emergency call service;

when the determined RAT is a RAT that supports cells that can provide the circuit switched (CS) emergency call service, select the cell, as a cell on which to camp; and when the determined RAT is a RAT that supports cells that cannot provide the CS or packet switched (PS) emergency call service, reject the cell, as a cell on which to camp.

* * * * *